United States Patent
Frank et al.

(10) Patent No.: US 12,554,977 B2
(45) Date of Patent: Feb. 17, 2026

(54) DEEP NEURAL NETWORK FOR MATCHING ENTITIES IN SEMI-STRUCTURED DATA

(71) Applicant: SAP SE, Walldorf (DE)

(72) Inventors: Matthias Frank, Heidelberg (DE); Hoang-Vu Nguyen, Leimen (DE); Stefan Klaus Baur, Heidelberg (DE); Alexey Streltsov, Heidelberg (DE); Jasmin Mankad, Weisloch (DE); Cordula Guder, Berlin (DE); Konrad Schenk, Potsdam (DE); Philipp Lukas Jamscikov, Mannheim (DE); Rohit Kumar Gupta, Heidelberg (DE)

(73) Assignee: SAP SE, Walldorf (DE)

( * ) Notice: Subject to any disclaimer, the term of this patent is extended or adjusted under 35 U.S.C. 154(b) by 822 days.

(21) Appl. No.: 17/025,845

(22) Filed: Sep. 18, 2020

(65) Prior Publication Data

US 2022/0092405 A1    Mar. 24, 2022

(51) Int. Cl.
*G06N 3/08*    (2023.01)
*G06F 16/81*   (2019.01)
*G06N 3/045*   (2023.01)

(52) U.S. Cl.
CPC ............. *G06N 3/08* (2013.01); *G06F 16/81* (2019.01); *G06N 3/045* (2023.01)

(58) Field of Classification Search
CPC ................................ G06N 3/08; G06N 3/045
See application file for complete search history.

(56) References Cited

U.S. PATENT DOCUMENTS

2019/0303465 A1*  10/2019  Shanmugamani .... G06F 16/221

OTHER PUBLICATIONS

Cheng Guo, & Felix Berkhahn. (2016). Entity Embeddings of Categorical Variables. (Year: 2016).*
Ebrahimi, M., ShafieiBavani, E., Wong, R., & Chen, F. (2018). A Unified Neural Network Model for Geolocating Twitter Users. In Proceedings of the 22nd Conference on Computational Natural Language Learning (pp. 42-53). Association for Computational Linguistics. (Year: 2018).*

(Continued)

*Primary Examiner* — Kakali Chaki
*Assistant Examiner* — Johnathan R Germick
(74) *Attorney, Agent, or Firm* — SCHWEGMAN LUNDBERG & WOESSNER, P.A.

(57) ABSTRACT

In an example embodiment, a deep neural network may be utilized to determine matches between candidate pairs of entities, as well as confidence scores that reflect how certain the deep neural network is about the corresponding match. The deep neural network is also able to find these matches without requiring domain knowledge that would be required if features for a machine-learned model were handcrafted, which is a drawback of prior art machine-learned models used to match entities in multiple tables. Thus, the deep neural network improves on the functioning of prior art machine learned models designed to perform the same tasks. Specifically, the deep neural network learns the relationships of tabular fields and the patterns that define a match from historical data alone, making this approach generic and applicable independent of the context.

20 Claims, 5 Drawing Sheets

(56) References Cited

OTHER PUBLICATIONS

Ankur P. Parikh, Oscar Täckstrom, Dipanjan Das, & Jakob Uszkoreit. (2016). A Decomposable Attention Model for Natural Language Inference. (Year: 2016).*

Lapedes, A., & Farber, R. (1987). How Neural Nets Work. In Neural Information Processing Systems. American Institute of Physics. (Year: 1987).*

Berkhahn, Felix, et al., "Entity Embeddings of Categorical Variables", arXiv:1604.06737v1 [cs.LG], (Apr. 22, 2016), 1-9.

Parikh, Ankur, et al., "A Decomposable Attention Model for Natural Language Inference" arXiv:1606.01933v2 [cs.CL], (Sep. 25, 2016), 7 pgs.

"European Application Serial No. 21185383.3, Extended European Search Report mailed Mar. 29, 22", 12 pgs.

Bordawekar, Rajesh, "Enabling Cognitive Intelligence Queries in Relational Databases using Low-dimensional Word Embeddings", arXiv: 1603.07185v1, (2016), 12 pgs.

Nie, Hao, "Deep Sequence-to-Sequence Entity Matching for Heterogeneous Entity Resolution", CIKM, (2019), 10 pgs.

Sage, Clement, "Recurrent Neural Network Approach for Table Field Extraction in Business Documents", ICDAR, (2019), 6 pgs.

* cited by examiner

DEEP NEURAL NETWORK FOR MATCHING ENTITIES IN SEMI-STRUCTURED DATA

TECHNICAL FIELD

This document generally relates to machine learning. More specifically, this document relates to a deep neural network for matching entities in semi-structured data.

BACKGROUND

Databases commonly store data in tables, with each row representing a different entity. Entities may be any element in a data set, including, for example, users, documents, organizations, locations, etc.; however, in many types of data storage each row in the table corresponds to a different entity. If the table is, for example, a table of documents, then each row represents a different document. One issue that can arise in data storage is an inability to match entities across multiple tables. For example, it may be difficult to determine whether an entity in one table is the same entity as listed in another table, as the data stored in the respective tables may not be normalized and thus the different tables may be storing information about the same entity in two different ways. A product catalog intended for consumers, for example, may contain information about a product that is stored in a different format than the same information in a product catalog intended for component suppliers. In some instances it can be beneficial to identify matches between the entities in different tables in order to reconcile the two different formats of information. In other instances this matching can be used to deduplicate entities that are not intended to be listed twice to reduce storage size.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a deep neural network may be utilized to determine matches between candidate pairs of entities, as well as confidence scores that reflect how certain the deep neural network is about the corresponding match. The deep neural network is also able to find these matches without requiring domain knowledge that would be required if features for a machine-learned model were handcrafted, which is a drawback of prior art machine-learned models used to match entities in multiple tables. Indeed, in some instances it may be impossible for a user to define a universal set of engineered features (such as where the semantics and exact usage of terminology may vary across countries and across organizations), making prior art techniques unusable. Thus, the deep neural network improves on the functioning of prior art machine-learned models designed to perform the same tasks. Specifically, the deep neural network learns the relationships of tabular fields and the patterns that define a match from historical data alone, making this approach generic and applicable independent of the context.

The tables themselves may be considered semi-structured. Some fields in the tables may contain structured data (i.e., they have a clear type, such as dates/numerical values such as amounts, volumes, and quantities, or categorical values, such as country or currency codes). Other fields in the tables are unstructured text-type fields, such as item descriptions, reference numbers, bank statement memo notes, company names, etc.). While for some of these text fields formatting conventions may exist, the data in the fields is typically entered by users and thus the content may vary substantially. For example, a bank transfer payment memo field may or may not contain an invoice number, reference numbers may or may not have leading zeroes, company names may or may not contain the city of the company, etc. These unstructured fields often carry the bulk of the information necessary to find matching entities.

One solution would be to use a basic form of automation to reconcile entities from different tables, such as "if amount matches between entities and invoice number is contained in bank payment memo field, then match." Such rules-based automation lacks flexibility in that it must be programmed with knowledge about the type of data in each of the fields and their corresponding meanings. Higher degrees of automation can be achieved using machine learning approaches that can handle "fuzzy" data and adapt to patterns from historical data.

A machine learning approach frames the task as a machine learning problem by using pair-wise match scoring. Specifically, a machine learning model f is trained on pairs of entities ($\vec{a}$, $\vec{b}$) from historical data (where $\vec{a}$ and $\vec{b}$ represent the tabular data of each of the two entities) and class labels $\vec{l}$ (e.g., "match" or "no match") to output a probabilistic score $\vec{p}$ that the items are a match (or more generally, a multi-class probabilistic score (e.g., "no match," "one-to-one match", "partial match")):

$$f(\vec{a}, \vec{b}) \to \vec{p}$$

The training data may be in the form of labeled pairs $\{\vec{a}^{(n)}, \vec{b}^{(n)}, \vec{l}^{(n)}\}_{n=1}^{N}$, where $\vec{l}^{(n)} = (\vec{l}_1^{(n)}, \ldots, \vec{l}_C^{(n)})$ is an indicator vector encoding the label and C is the number of output classes. At test time, a pair of entities (a, b) is received and the goal is to predict the correct label y. Notably, while training data is mentioned specifically in this section, it is used to train the entire neural network jointly.

The training data is obtained from historical data, which specifies which entities are considered matching. Then the training data is constructed from these positive examples (pairs that constitute a "one-to-one match", or "partial match") and generated pairs of negative examples of class (no match).

To find the match(es) for a given entity $\vec{a}$, all M relevant candidate pairs $\{(\vec{a}, \vec{b}^{(m)})\}_{m=1}^{M}$ e scored, the results are aggregated, and the best match (or combination of partial matches) is chosen as output, together with a confidence score that reflects how certain the model is on the result.

Prior machine learning approaches to this problem relied on engineered features or other types of pre-assigned relationships between the fields of the tables. As mentioned earlier, however, this approach does not work in areas where domain knowledge is not available. This is a common occurrence where, for example, the model creators are different from the users of the model. A software organization may, for example, create the model, but the model may be used by a business industry that the software organization does not know, or is unfamiliar with (e.g., a healthcare business, or a sprinkler component manufacturer).

In an example embodiment, a deep neural network is utilized as the machine learning model, and trained in such a way that domain knowledge of the meanings of fields in the tables or the relationships between fields in the tables are not needed during training.

Figure 1:
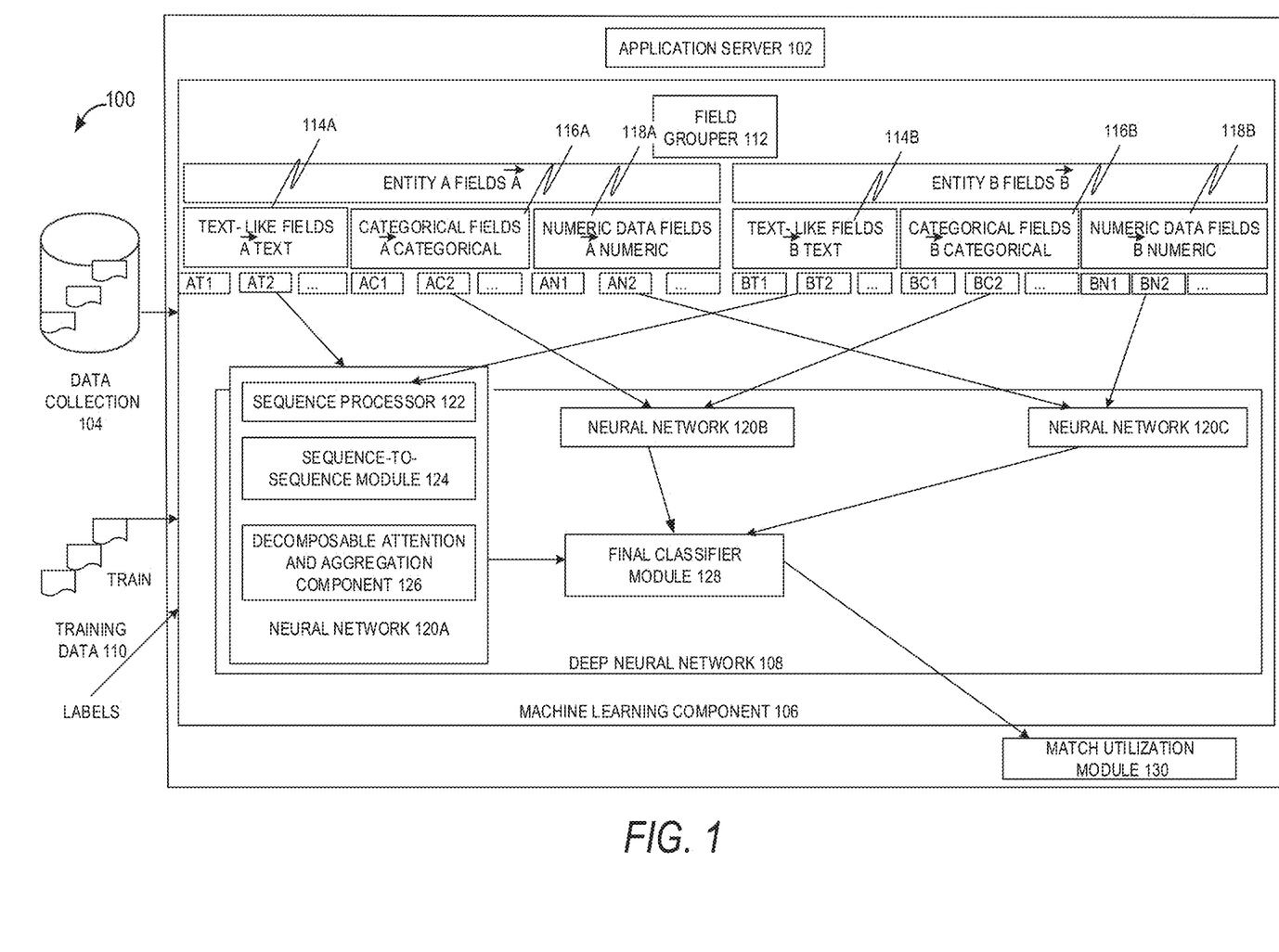
FIG. 1 is a block diagram illustrating a system for using machine learning to match entities in tables, in accordance with an example embodiment.

FIG. 1 is a block diagram illustrating a system 100 for using machine learning to match entities in tables, in accordance with an example embodiment. Here, an application server 102 runs a series of components to perform the matching. In some example embodiment, the application server 102 may be cloud-based. A data collection 104 of an organization may contain many different document tables (potentially thousands or millions) for the organization. One or more of these tables may be passed to a machine learning component 106, which acts to identify matching entities among the tables. Prior to that occurring, a deep neural network 108 within the machine learning component 106 may be trained using training data 110, which may be sample tables with entities having labels identifying matches (either complete, i.e., one-to-one matches, or partial matches, such as where a single payment corresponds to several different invoices, or vice-versa). A field grouper 112 may act to group fields within each table from the training data 110 into one of three different field types. The first field type are text-like fields, represented as $\vec{a}_{text}$ 114A or $\vec{b}_{text}$ 114B, categorical fields, represented as $\vec{a}_{categorical}$ 116A or $\vec{b}_{categorical}$ 116B, numeric and date fields, represented as $\vec{a}_{numeric}$ 118A or $\vec{b}_{numeric}$ 118B. The deep neural network 108 comprises separate neural networks 120A, 120B, 120C for each of these types of fields.

Text-like fields are fields containing unstructured texts, such as names, invoice numbers, etc. Categorical fields are fields containing category identifications, such as country keys, currency codes, etc. Numeric features are fields containing structured numbers and dates.

Image parts may contain text even though they are not themselves text. As such, optical character recognition may be performed on the image parts to identify the text in the image. Depending on the file format of the document file, optical character recognition may also be performed on the text parts of the document (in some file formats, the text parts are already stored in text-readable form and thus do not require optical character recognition).

For categorical fields, neural network 120B comprises a categorical embedding model that converts the value of each field to a vector in an n-dimensional space (a vector in this context meaning a one-dimensional array of values, or coordinates in the n-dimensional space). This conversion is performed using a trainable embedding-lookup. Specifically, categorical variables are mapped in a function approximation problem into Euclidean spaces, which are the entity embeddings of the categorical variables. The mapping is itself learned by a neural network. This embedding is then followed by a dense feed forward neural network.

For numerical fields, these fields may be normalized, such as by converting dates or timestamps to a numerical scale, such as days/seconds since some fixed date and time.

In an optional example embodiment, numeric and categorical fields can be treated as text fields, such as by appending their text representations to the text vectors (either by keeping them as numeric and categorical inputs or only using their text representations).

Text-like fields, which represent series of text strings from different tabular fields, are tokenized. In an example embodiment, each Unicode character is a token, but in other embodiments a word or sub-word-based tokenizer may be used. Specifically, a series of operations can be performed by a sequence processor 122 in the neural network 120A. Specifically, the sequence processor 122 tokenizes and concatenates the text fields of entities $\vec{a}_{text}$ to form the input sequences $a=(a_1, \ldots, a_{l_a})$ and $b=(b_1, \ldots, b_{l_b})$ of length $l_a$ and $l_b$, respectively. These sequences are then transformed into a sequence of float vectors (of dimension $k_{emb,text}$) via a trainable embedding lookup. In an alternative implementation to the trainable embedding lookup, a pre-trained word embedding looked up may be used in case the tokenization is word based.

A second sequence of tokens is generated to encode the information on which tabular field in the original sequence each of the characters (or words or sub-words) originated. A second trainable embedding lookup is used to transform it to a length $l_a$ sequence of $k_{emb,field}$-dimensional vectors.

The two sequences are then stacked along the vector dimension, forming a length $l_a$ sequence of k-dimensional vectors ($k=k_{emb,text}+k_{emb,field}$).

The stacked sequence is then processed by a sequence-to-sequence module 124, possibly by padding the stacked sequence with leading 0s to a fixed length. In an example embodiment, a multi-layer 1d-convolution network is utilized, although in other example embodiments a recurrent neural network or self-attention/transformer module is possible. The sequence-to-sequence module 124 outputs a length $l'_a$ sequence of k'-dimensional vectors, which we denote $$\overline{a} = (\overline{a}_1, \ldots, \overline{a}_{l'_a}).$$

An analogous processing is applied to the text fields $\vec{b}_{text}$ to obtain a second pre-processed sequence $$\overline{b} = (\overline{b}_1, \ldots, \overline{b}_{l'_b}).$$

As notation, the sequence-to-sequence module 124 can be denoted as trainable mapping functions $F_A$ and $F_B$ with $\bar{a}=F_A(a)$ and $\bar{b}=F_B(b)$. Depending on the use-case, some of the trainable parameters may be shared between $F_A$ and $F_B$. If all parameters are shared, we would have $F_A=F_B$.

The token-level embedding lookup can model correspondences between individual tokens (e.g., "a" is similar to "A", "α", and "ā"). Augmenting the token sequence with field-of-origin information enables the model to learn relationships between tabular fields. For instance, in a bank statement-to-invoice matching task, a common string of numbers between an invoice number field and the payment note may indicate a match, but a common string of numbers between an invoice number and a payment amount or a postal code would be by chance and have no significance.

Further processing in the sequence-to-sequence operation allows the algorithm to model the context of the tokens (e.g., leading 0's may be less significant) and learn correspondences of multi-token sequences (e.g., "Volkswagen" may correspond to "VW" and corresponding language in a foreign alphabet (such as Japanese)).

Specifically, a decomposable attention and aggregation component 126 utilizes decomposable attention to perform alignment and comparison of the sequences.

Figure 2:
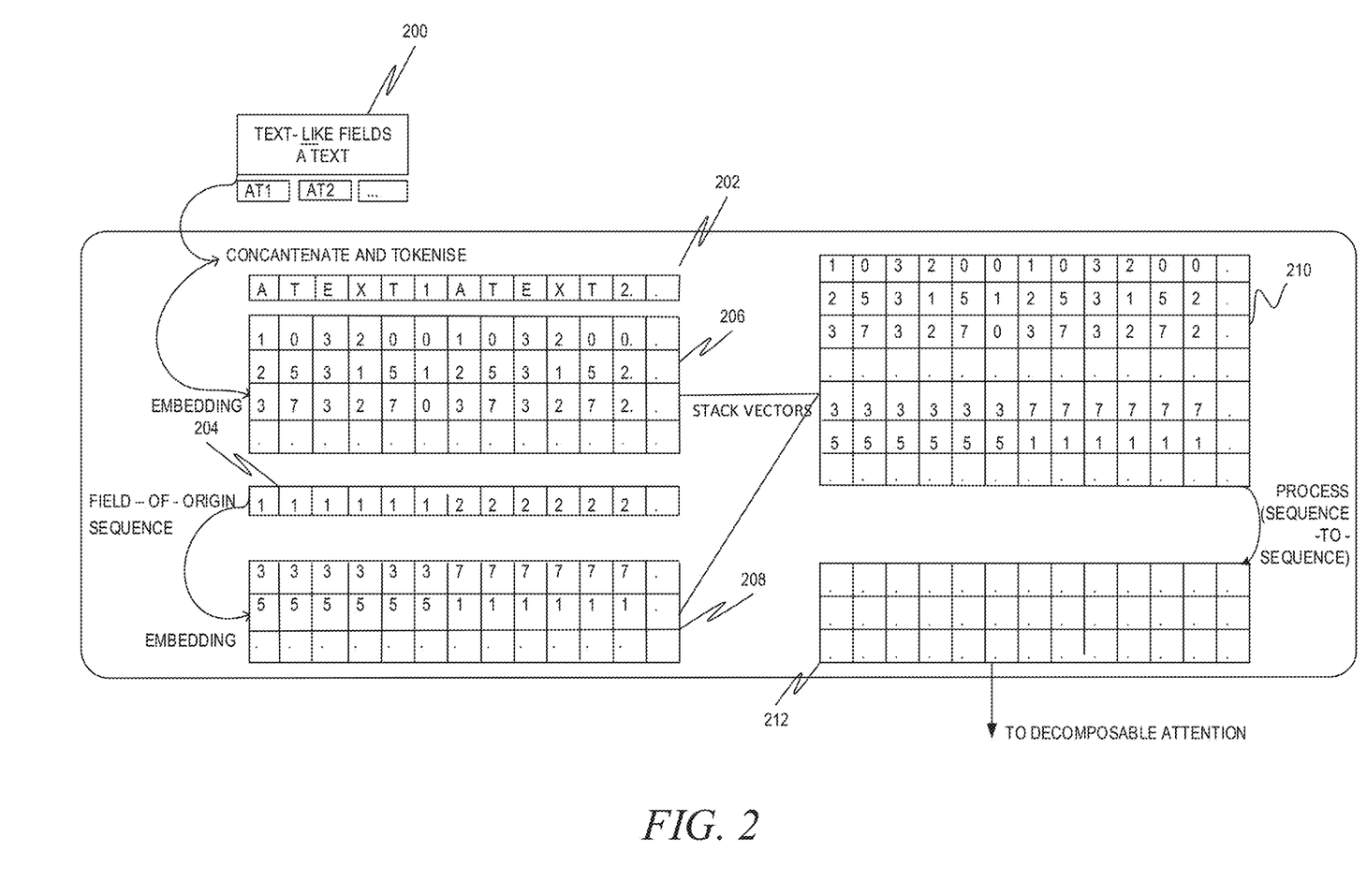
FIG. 2 is a diagram illustrating an example of sequence processing operations in accordance with an example embodiment.

FIG. 2 is a diagram illustrating an example of sequence processing operations in accordance with an example embodiment. This figure depicts how text-like fields 200 of an entity are tokenized and concatenated into a first sequence 202 and then a second sequence 204 is generated indicating the field position of the fields in which the corresponding tokens reside. Both the first sequence 202 and the second sequence 204 are then mapped to embeddings 206 and 208, respectively. The embeddings 206 and 208, which may be stored as matrices, are then stacked together and aligned into matrix 210. The sequence-to-sequence module then outputs the k'-dimensional vectors 212.

The k'-dimensional vectors $\bar{a}$ and $\bar{b}$ (identical with the vectors 212) are then passed to the decomposable attention and aggregation component 126, which operates as follows:

The core model comprises the following three components, which are trained jointly:

Attend. First, soft-align the elements of $\bar{a}$ and $\bar{b}$ using a variant of neural attention and decompose the problem into the comparison of aligned subphrases.

Compare. Second, separately compare each aligned subphrase to produce a set of vectors $\{v_{1,i}\}_{i=1}^{\ell_a}$ for a and $\{v_{2,j}\}_{j=1}^{\ell_b}$ for b. Each $v_{1,i}$ is a nonlinear combination of $a_i$ and its (softly) aligned subphrase in b (and analogously for $v_{2,j}$).

Aggregate. Finally, aggregate the sets $\{v_{1,i}\}_{i=1}^{\ell_a}$ and $\{v_{2,j}\}_{j=1}^{\ell_b}$ from the previous step and use the result to predict the label $\hat{y}$.

We first obtain unnormalized attention weights $e_{ij}$, computed by a function F', which decomposes as:

$$e_{ij} := F'(\bar{a}_i, \bar{b}_j) := \bar{a}_i^T \cdot \bar{b}_j \big( = [F_A(a)]_i^T \cdot [F_B(b)]_j \big).$$

This decomposition avoids the quadratic complexity that would be associated with separately applying F' $\ell_a \times \ell_b$ times. Instead, only $\ell_a + \ell_b$ applications of $F_{A/B}$ are needed. These attention weights are normalized as follows:

$$\beta_i := \sum_{j=1}^{\ell_b} \frac{\exp(e_{ij})}{\sum_{k=1}^{\ell_b} \exp(e_{ik})} \bar{b}_j,$$

$$\alpha_j := \sum_{i=1}^{\ell_{ba}} \frac{\exp(e_{ij})}{\sum_{k=1}^{\ell_{ba}} \exp(e_{kj})} \bar{a}_i.$$

Here $\beta_i$ is the subphrase in $\bar{b}$ that is (softly) aligned to $\bar{a}_i$ and vice versa for $\alpha_j$.

Next, the aligned phrases $\{(\bar{a}_i, \beta_i)\}_{i=1}^{\ell_a}$ and $\{(\bar{b}_j, \alpha_j)\}_{j=1}^{\ell_b}$ are separately compared using a function G, which is again a feed-forward network:

$$v_{1,i} := G([\bar{a}_i, \beta_i]) \quad \forall i \in [1, \ldots, \ell_a],$$

$$v_{2,j} := G([\bar{b}_j, \alpha_j]) \quad \forall j \in [1, \ldots, \ell_b].$$

where the brackets [ . , . ] denote concatenation. Note that since there are only a linear number of terms in this case, there is no need to apply a decomposition as was done in the previous step. Thus G can jointly take into account both $\bar{a}_i$ and $\beta_i$.

There are now two sets of comparison vectors $\{v_{1,i}\}_{i=1}^{\ell_a}$ and $\{v_{2,j}\}_{j=1}^{\ell_b}$. First, the system may aggregate over each set by some sort of pooling, such as average, max pooling, or summation:

$$v_1 = \sum_{i=1}^{\ell_a} v_{1,i}, \quad v_2 = \sum_{j=1}^{\ell_b} v_{2,j}.$$

and feed the result through a final classifier H, which is a feed forward network followed by a linear layer:

$$\hat{y} = H([v_1, v_2]),$$

where $\hat{y} \in \mathbb{R}^C$ represents the predicted (unnormalized) scores for each class and consequently the predicted class is given by $\hat{y} = \operatorname{argmax}_i \hat{y}_i$.

For training, a multi-class cross-entropy loss with dropout regularization may be used:

$$L(\theta_F, \theta_G, \theta_H) = \frac{1}{N} \sum_{n=1}^{N} \sum_{c=1}^{C} l_c^{(n)} \log \frac{\exp(\hat{y}_c)}{\sum_{c'=1}^{C} \exp(\hat{y}_{c'})}$$

Here $\theta_F$, $\theta_G$, $\theta_H$ denote the learnable parameters of the functions $F_{A/B}$, G and H, respectively.

Referring back to FIG. 1, a final classifier module 128 comprises a dense neural network with a multi-class output. It receives the outputs of all of the previous modules and yields probabilities for the classes that the model was trained on.

A match utilization module 130 may then utilize the output of the final classifier module 128 as well as the confidence scores to perform one or more actions related to the matching (or partially matching, or non-matching) entities. For example, matching entities may be presented to a user in a graphical user interface for reconciliation. Alternatively, the matching entities may be automatically reconciled, meaning that an action is performed on one of the entities based on it matching the other entity. As an example, an entity representing an incoming payment may be matched, either partially or completely, to an entity representing an invoice to which that payment should be applied. Reconciliation then involves applying the payment to the invoice and creating a record of that process so that the parties involved know that the payment has been applied to the invoice.

Alternatively, rather than using the output of the final classifier module 128 for reconciliation purposes, the match utilization module 130 may utilize it for deduplication purposes. Specifically, if, for example, matching entities appear in redundant tables or even in the same tables, one of the entities may be removed and/or combined into the other entity, as they are considered duplicates or redundant in some way.

Figure 3:
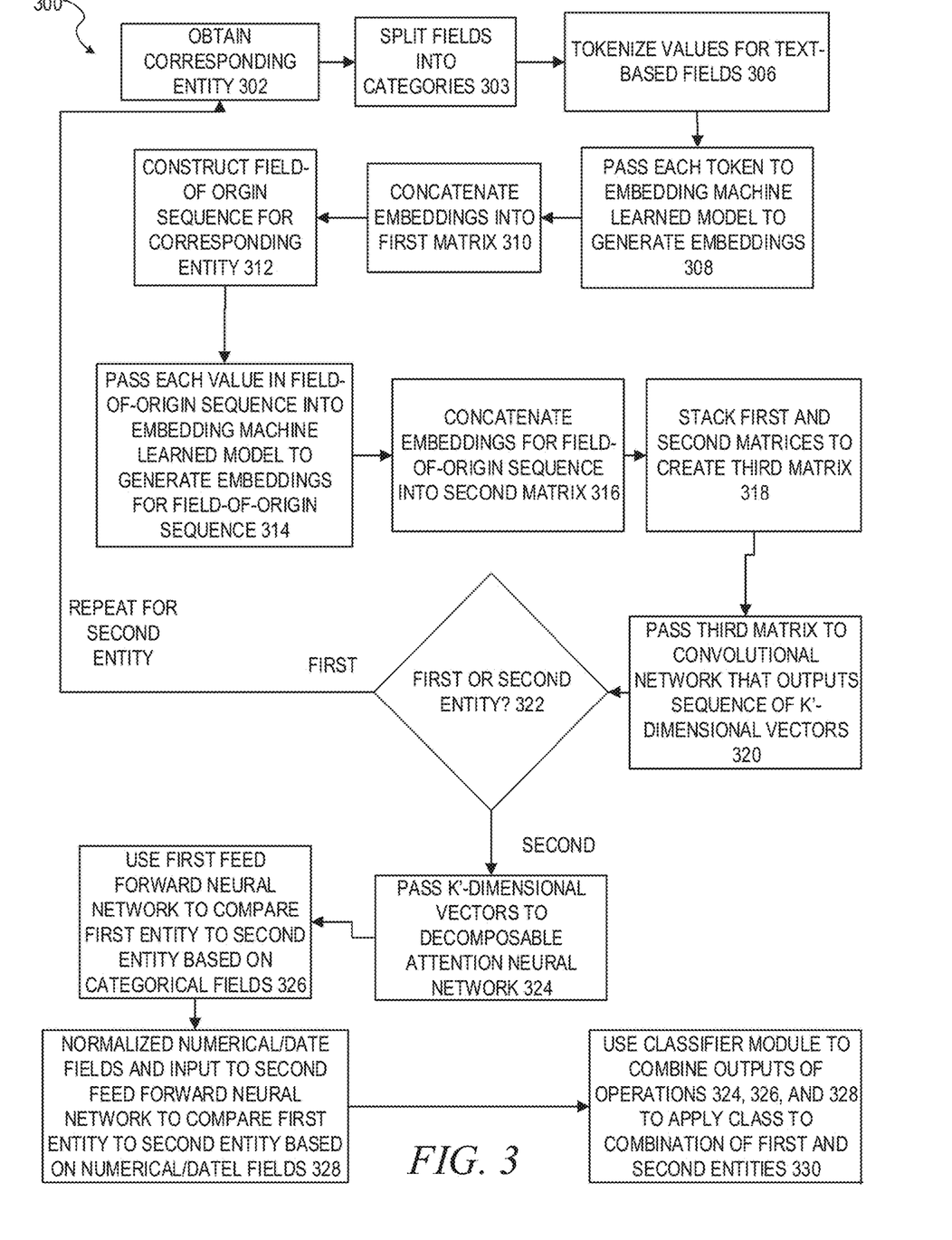
FIG. 3 is a flow diagram illustrating a method of matching entities in tables using machine learned models, in accordance with an example embodiment.

FIG. 3 is a flow diagram illustrating a method 300 of matching entities in tables using machine learned models, in accordance with an example embodiment. This method 300 will be described in terms of comparing a first entity with a second entity to determine whether it is a match. In practice, in order to identify matches or partial matches, in some example embodiments the method 300 may be repeated for various combinations of entities in tables being examined. For example, if table #1 has 10 entities and table #2 has 8 entities, then 80 different combinations of entities from table #1 and table #2 may be examined. In some example embodiments, entities from the same table can also be compared with one another, resulting in even more combinations being examined.

A loop is begun for each of the two entities. At operation 302, the corresponding entity is obtained, which includes values for a plurality of fields. At operation 304, the fields are split into categories, one for text-based fields, one for categorical fields, and one for numerical/date fields. At operation 306, values for the text-based fields are tokenized. At operation 308, each of the tokens is passed to an embedding machine learning model trained by a first machine learning algorithm to generate a set of coordinates in an n-dimensional space for an input, producing embeddings comprising a set of coordinates for each of the one or more tokens. At operation 310, the embeddings for each of the one or more tokens are concatenated into a first matrix;

At operation 312, a field-of-origin sequence is constructed for the entity. The field-of-origin sequence comprises an identification of a text-based field corresponding to the value from which a token was generated, for each of the one or more tokens for each of the text-based fields. At operation 314, each value in the field-of-origin sequence is passed into the embedding machine-learned model to generate a set of coordinates for each value in the field-of-origin sequence. At operation 316, the embeddings for each value in the tield-of-origin sequence are concatenated into a second matrix.

At operation 318, the first and second matrices are stacked to create a third matrix. At operation 320, the third matrix is passed to a multi-layer 1d convolution network that outputs a sequence of k'-dimensional vectors. At operation 322, it is determined whether the entity was the first or second entity. If it was the first, then the method 300 loops back to operation 302 for the second entity. If it was the second, then at operation 324 the k'-dimensional vectors are passed to a decomposable attention neural network to compare the first entity to the second entity, based on the text-based fields. At operation 326, a first feed forward neural network is used to compare the first entity to the second entity based on the categorical fields. At operation 328, the numeric/date fields are normalized and used as input to a second feed forward neural network to compare the first entity to the second entity based on the numeric/date fields.

At operation 330, a classifier module then combines the output of operations 324, 326, and 328 and applies a class to the combination of the first and second entities. This class may include a label such as match, no match, or partial match. The classification may be at least partially based on confidence values output during operations 324, 326, and 328. The output of the neural network (which classifies pairs into match/partial match/no match classes) then used as input into a rule-based logic to construct the finally proposed single or multi-matches by applying a confidence threshold).

Example 1. A system comprising:
  at least one hardware processor; and
  a non-transitory computer-readable medium storing instructions that, when executed by the at least one hardware processor, cause the at least one hardware processor to perform operations comprising:
    obtaining a first entity in a first table, the first entity comprising values for a plurality of fields;
    tokenizing the values in one or more fields of the plurality of fields into one or more tokens;
    passing each of the one or more tokens to an embedding machine learned model trained by a first machine learning algorithm to generate a set of coordinates in an n-dimensional space for an input, producing embeddings comprising coordinates for each of the one or more tokens;
    concatenating the embeddings for the one or more tokens and for each of the one or more fields of the plurality of fields in the first entity into a first matrix;
    constructing a field-of-origin sequence for the first entity, the field-of-origin sequence comprising an identification of a field corresponding to the value from which a token was generated, for each of the one or more tokens for each of the one or more fields of the plurality of fields in the first entity;
    passing each value in the field-of-origin sequence into the embedding machine learned model to generate a set of coordinates for each value in the field-of-origin sequence;
    concatenating the embeddings for each value in the field-of-origin sequence into a second matrix;
    stacking the first and second matrix to create a third matrix; and
    passing the third matrix to a decomposable attention neural network to compare the first entity to a second entity represented by its own matrix of embeddings.

Example 2. The system of Example 1, wherein the operations further comprise:
  obtaining a second entity in a second table, the second entity comprising values for a plurality of fields;
  tokenizing the values in each of one or more fields of the plurality of fields in the second entity into one or more tokens;
  passing each of the one or more tokens to the embedding machine learned model, producing embeddings comprising a set of coordinates for each of the one or more tokens of the second entity;
  concatenating the embeddings for each of the one or more tokens and for each of the one or more fields of the plurality of fields in the second entity into a fourth matrix;
  constructing a field-of-origin sequence for the second entity, the field-of-origin sequence comprising an identification of a field corresponding to the value from which a token was generated, for each of the one or more tokens for each of the one or more fields of the plurality of fields in the second entity;

passing each value in the field-of-origin sequence for the second entity into the embedding machine learned model to generate a set of coordinates for each value in the field-of-origin sequence for the second entity;

concatenating the embeddings for each value in the field-of-origin sequence for the second entity into a fifth matrix; and stacking the fourth and fifth matrix to create a sixth matrix, the sixth matrix being compared to the third matrix by the decomposable attention neural network.

Example 3. The system of Example 2, wherein the operations further comprise passing output of the decomposable attention neural network to a classifier module, the classifier module comprising a dense neural network with a multi-class output.

Example 4. The system of Example 3, wherein the multi-class output includes separate classes for match, partial match, and no match.

Example 5. The system of any of Examples 1-4, wherein the operations further comprise splitting the plurality of fields in the first entity into three categories of fields: text-based fields, categorical fields, and numerical/date fields, and wherein the one or more fields of the plurality of fields are the text-based fields.

Example 6. The system of Example 5, wherein the operations further comprise passing the values of the categorical fields to a second embedding machine learned model followed by a first feed forward neural network.

Example 7. The system of Examples 5 or 6, wherein the operations further comprise normalizing values in the numerical/date fields and passing the normalized values to a second teed forward neural network.

Example 8. A method comprising:
  obtaining a first entity in a first table, the first entity comprising values for a plurality of fields;
  tokenizing the values in one or more fields of the plurality of fields into one or more tokens;
  passing each of the one or more tokens to an embedding machine learned model trained by a first machine learning algorithm to generate a set of coordinates in an n-dimensional space for an input, producing embeddings comprising coordinates for each of the one or more tokens;
  concatenating the embeddings for the one or more tokens and for each of the one or more fields of the plurality of fields in the first entity into a first matrix;
  constructing a field-of-origin sequence for the first entity, the field-of-origin sequence comprising an identification of a field corresponding to the value from which a token was generated, for each of the one or more tokens for each of the one or more fields of the plurality of fields in the first entity;
  passing each value in the field-of-origin sequence into the embedding machine learned model to generate a set of coordinates for each value in the field-of-origin sequence;
  concatenating the embeddings for each value in the field-of-origin sequence into a second matrix;
  stacking the first and second matrix to create a third matrix; and
  passing the third matrix to a decomposable attention neural network to compare the first entity to a second entity represented by its own matrix of embeddings.

Example 9. The method of Example 8, further comprising:
  obtaining a second entity in a second table, the second entity comprising values for a plurality of fields;
  tokenizing the values in each of one or more fields of the plurality of fields in the second entity into one or more tokens;
  passing each of the one or more tokens to the embedding machine learned model, producing embeddings comprising a set of coordinates for each of the one or more tokens of the second entity;
  concatenating the embeddings for each of the one or more tokens and for each of the one or more fields of the plurality of fields in the second entity into a fourth matrix;
  constructing a field-of-origin sequence for the second entity, the field-of-origin sequence comprising an identification of a field corresponding to the value from which a token was generated, for each of the one or more tokens for each of the one or more fields of the plurality of fields in the second entity;
  passing each value in the tield-of-origin sequence for the second entity into the embedding machine learned model to generate a set of coordinates for each value in the field-of-origin sequence for the second entity;
  concatenating the embeddings for each value in the field-of-origin sequence for the second entity into a fifth matrix; and
  stacking the fourth and fifth matrix to create a sixth matrix, the sixth matrix being compared to the third matrix by the decomposable attention neural network.

Example 10. The method of Example 9, further comprising passing output of the decomposable attention neural network to a classifier module, the classifier module comprising a dense neural network with a multi-class output.

Example 11. The method of Example 10, wherein the multi-class output includes separate classes for match, partial match, and no match.

Example 12, The method of any of Examples 8-11, further comprising splitting the plurality of fields in the first entity into three categories of fields: text-based fields, categorical fields, and numerical/date fields, and wherein the one or more fields of the plurality of fields are the text-based fields.

Example 13. The method of Example 12, further comprising passing the values of the categorical fields to a second embedding machine learned model followed by a first feed forward neural network.

Example 14. The method of Examples 12 or 13, further comprising normalizing values in the numerical/date fields and passing the normalized values to a second feed forward neural network.

Example 15. A non-transitory machine-readable medium storing instructions which, when executed by one or more processors, cause the one or more processors to perform operations comprising:
  obtaining a first entity in a first table, the first entity comprising values for a plurality of fields;
  tokenizing the values in one or more fields of the plurality of fields into one or more tokens;
  passing each of the one or more tokens to an embedding machine learned model trained by a first machine learning algorithm to generate a set of coordinates in an n-dimensional space for an input, producing embeddings comprising coordinates for each of the one or more tokens;
  concatenating the embeddings for the one or more tokens and for each of the one or more fields of the plurality of fields in the first entity into a first matrix;

constructing a field-of-origin sequence for the first entity, the field-of-origin sequence comprising an identification of a field corresponding to the value from which a token was generated, for each of the one or more tokens for each of the one or more fields of the plurality of fields in the first entity;

passing each value in the field-of-origin sequence into the embedding machine learned model to generate a set of coordinates for each value in the field-of-origin sequence;

concatenating the embeddings for each value in the field-of-origin sequence into a second matrix;

stacking the first and second matrix to create a third matrix; and passing the third matrix to a decomposable attention neural network to compare the first entity to a second entity represented by its own matrix of embeddings.

Example 16, The non-transitory machine-readable medium of Example 15, wherein the operations further comprise:

obtaining a second entity in a second table, the second entity comprising values for a plurality of fields;

tokenizing the values in each of one or more fields of the plurality of fields in the second entity into one or more tokens;

passing each of the one or more tokens to the embedding machine learned model, producing embeddings comprising a set of coordinates for each of the one or more tokens of the second entity;

concatenating the embeddings for each of the one or more tokens and for each of the one or more fields of the plurality of fields in the second entity into a fourth matrix;

constructing a field-of-origin sequence for the second entity, the field-of-origin sequence comprising an identification of a field corresponding to the value from which a token was generated, for each of the one or more tokens for each of the one or more fields of the plurality of fields in the second entity;

passing each value in the field-of-origin sequence for the second entity into the embedding machine learned model to generate a set of coordinates for each value in the field-of-origin sequence for the second entity;

concatenating the embeddings for each value in the field-of-origin sequence for the second entity into a fifth matrix; and stacking the fourth and fifth matrix to create a sixth matrix, the sixth matrix being compared to the third matrix by the decomposable attention neural network.

Example 17. The non-transitory machine-readable medium of Example 16, wherein the operations further comprise passing output of the decomposable attention neural network to a classifier module, the classifier module comprising a dense neural network with a multi-class output.

Example 18. The non-transitory machine-readable medium of Example 17, wherein the multi-class output includes separate classes for match, partial match, and no match.

Example 19. The non-transitory machine-readable medium of any of Examples 15-18, wherein the operations further comprise splitting the plurality of fields in the first entity into three categories of fields: text-based fields, categorical fields, and numerical/date fields, and wherein the one or more fields of the plurality of fields are the text-based fields.

Example 20, The non-transitory machine-readable medium of Example 19, wherein the operations further comprise passing the values of the categorical fields to a second embedding machine learned model followed by a first feed forward neural network.

Figure 4:
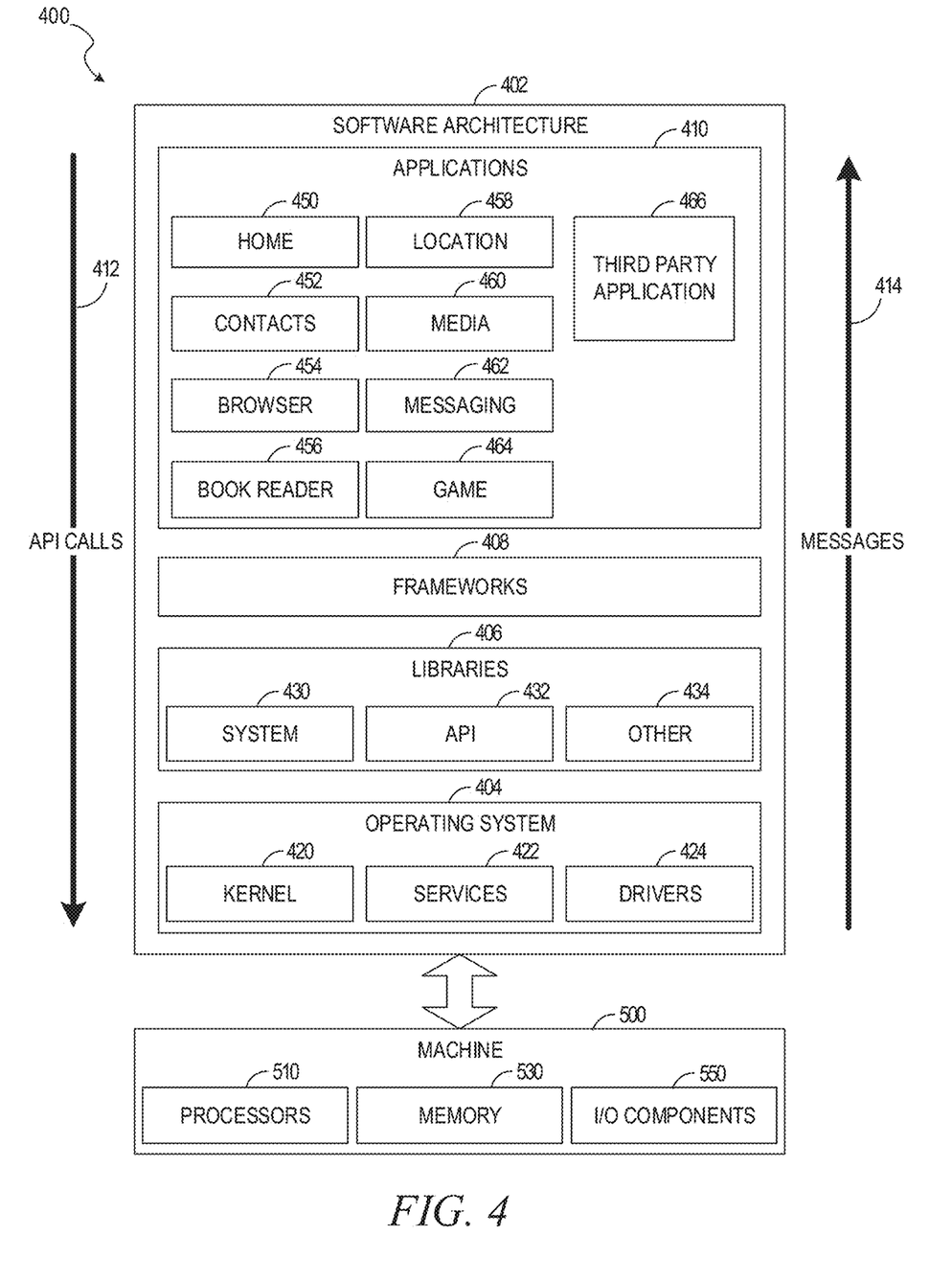
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
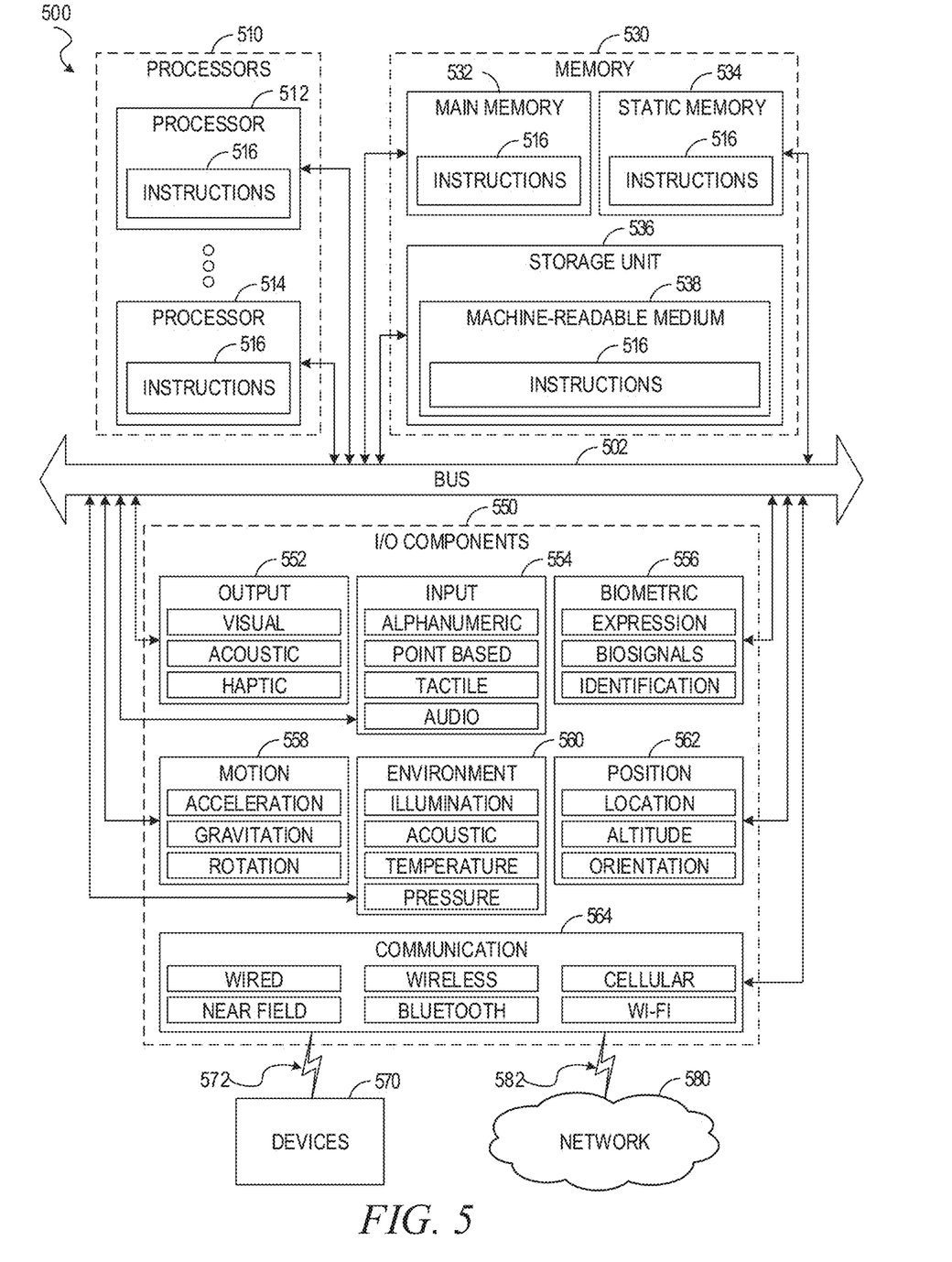
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an apples, an app, or other executable code) for causing the machine 500 to perform any one or more of the methodologies discussed herein may be executed. For example, the instructions 516 may cause the machine 500 to execute the methods of FIG. 4. Additionally, or alternatively, the instructions 516 may implement FIGS. 1-4 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing training data, the training data comprising plurality of tables with entities having labels identifying partial or complete entity matches, each entity comprising a plurality of fields, each field comprising a field identification and a value;
   tokenizing values in the plurality of tables into one or more training tokens;
   passing each of the one or more training tokens to a trained embedding machine learned model, producing embeddings comprising coordinates for each of the one or more training tokens, wherein an embedding is a set of coordinates in an n-dimensional space;
   concatenating the embeddings for the one or more training tokens into a first matrix;
   constructing a field-of-origin sequence for a first entity of the entities, the field-of-origin sequence comprising a combination of the field identifications of the one or more fields in which the values that were tokenized are stored;
   passing each field identification in the field-of-origin sequence into the embedding machine learned model to generate an embedding for each field identification in the field-of-origin sequence;
   concatenating the embeddings for each field identification in the field-of-origin sequence into a second matrix;
   stacking the first and second matrix to create a third matrix; and
   jointly training an attend portion of a decomposable attention neural network, to align elements of the first and second matrix using neural attention, and a compare portion of the decomposable attention neural network, to compare the first entity to a second entity, of the entities, represented by its own matrix of embeddings and to determine if the third matrix matches the matrix of embeddings representing the second entity based on the comparing.

2. The system of claim 1, wherein the operations further comprise:
   obtaining a second entity in a second table, the second entity comprising a plurality of fields, each field in the second entity including a field identification and a value;
   tokenizing the values in each of one or more fields of the plurality of fields in the second entity into one or more tokens;
   passing each of the one or more tokens to the embedding machine learned model, producing embeddings comprising a set of coordinates for each of the one or more tokens of the second entity;
   concatenating the embeddings for each of the one or more tokens and for each of the one or more fields of the plurality of fields in the second entity into a fourth matrix;
   constructing a field-of-origin sequence for the second entity, the field-of-origin sequence comprising a combination of the field identifications of the one or more fields in the second entity;
   passing each field identification in the field-of-origin sequence for the second entity into the embedding machine learned model to generate a set of coordinates for identification value in the field-of-origin sequence for the second entity;
   concatenating the embeddings for each field identification in the field-of-origin sequence for the second entity into a fifth matrix; and
   stacking the fourth and fifth matrix to create a sixth matrix, the sixth matrix being compared to the third matrix by the decomposable attention neural network.

3. The system of claim 2, wherein the operations further comprise passing output of the decomposable attention neural network to a classifier module, the classifier module comprising a dense neural network with a multi-class output.

4. The system of claim 3, wherein the multi-class output includes separate classes for match, partial match, and no match.

5. The system of claim 1 wherein the operations further comprise splitting the plurality of fields in the first entity into three categories of fields: text-based fields, categorical fields, and numerical/date fields, and wherein the one or more fields of the plurality of fields are the text-based fields.

6. The system of claim 5, wherein the operations further comprise passing the values of the categorical fields to a second embedding machine learned model followed by a first feed forward neural network.

7. The system of claim 6, wherein the operations further comprise normalizing values in the numerical/date fields and passing the normalized values to a second feed forward neural network.

8. A method comprising:
   accessing training data, the training data comprising plurality of tables with entities having labels identifying partial or complete entity matches, each entity comprising a plurality of fields, each field comprising a field identification and a value;
   tokenizing values in the plurality of tables into one or more training tokens;
   passing each of the one or more training tokens to a trained embedding machine learned model, producing embeddings comprising coordinates for each of the one or more training tokens, wherein an embedding is a set of coordinates in an n-dimensional space;
   concatenating the embeddings for the one or more training tokens into a first matrix;
   constructing a field-of-origin sequence for a first entity of the entities, the field-of-origin sequence comprising a combination of the field identifications of the one or more fields in which the values that were tokenized are stored;

passing each field identification in the field-of-origin sequence into the embedding machine learned model to generate an embedding for each field identification in the field-of-origin sequence;
concatenating the embeddings for each field identification in the field-of-origin sequence into a second matrix;
stacking the first and second matrix to create a third matrix; and
jointly training an attend portion of a decomposable attention neural network, to align elements of the first and second matrix using neural attention, and a compare portion of the decomposable attention neural network, to compare the first entity to a second entity, of the entities, represented by its own matrix of embeddings and to determine if the third matrix matches the matrix of embeddings representing the second entity based on the comparing.

9. The method of claim 8, further comprising:
obtaining a second entity in a second table, the second entity comprising a plurality of fields, each field in the second entity including a field identification and a value;
tokenizing the values in each of one or more fields of the plurality of fields in the second entity into one or more tokens;
passing each of the one or more tokens to the embedding machine learned model, producing embeddings comprising a set of coordinates for each of the one or more tokens of the second entity;
concatenating the embeddings for each of the one or more tokens and for each of the one or more fields of the plurality of fields in the second entity into a fourth matrix;
constructing a field-of-origin sequence for the second entity, the field-of-origin sequence comprising a combination of the field identifications of the one or more fields in the second entity;
passing each field identification in the field-of-origin sequence for the second entity into the embedding machine learned model to generate a set of coordinates for identification value in the field-of-origin sequence for the second entity;
concatenating the embeddings for each field identification in the field-of-origin sequence for the second entity into a fifth matrix; and
stacking the fourth and fifth matrix to create a sixth matrix, the sixth matrix being compared to the third matrix by the decomposable attention neural network.

10. The method of claim 9, further comprising passing output of the decomposable attention neural network to a classifier module, the classifier module comprising a dense neural network with a multi-class output.

11. The method of claim 10, wherein the multi-class output includes separate classes for match, partial match, and no match.

12. The method of claim 8, further comprising splitting the plurality of fields in the first entity into three categories of fields: text-based fields, categorical fields, and numerical/date fields, and wherein the one or more fields of the plurality of fields are the text-based fields.

13. The method of claim 12, further comprising passing the values of the categorical fields to a second embedding machine learned model followed by a first feed forward neural network.

14. The method of claim 13, further comprising normalizing values in the numerical/date fields and passing the normalized values to a second feed forward neural network.

15. A non-transitory machine-readable medium storing instructions which, when executed by one or more processors, cause the one or more processors to perform operations comprising:
accessing training data, the training data comprising plurality of tables with entities having labels identifying partial or complete entity matches, each entity comprising a plurality of fields, each field comprising a field identification and a value;
tokenizing values in the plurality of tables into one or more training tokens;
passing each of the one or more training tokens to a trained embedding machine learned model, producing embeddings comprising coordinates for each of the one or more training tokens, wherein an embedding is a set of coordinates in an n-dimensional space;
concatenating the embeddings for the one or more training tokens into a first matrix;
constructing a field-of-origin sequence for a first entity of the entities, the field-of-origin sequence comprising a combination of the field identifications of the one or more fields in which the values that were tokenized are stored;
passing each field identification in the field-of-origin sequence into the embedding machine learned model to generate an embedding for each field identification in the field-of-origin sequence;
concatenating the embeddings for each field identification in the field-of-origin sequence into a second matrix;
stacking the first and second matrix to create a third matrix; and
jointly training an attend portion of a decomposable attention neural network, to align elements of the first and second matrix using neural attention, and a compare portion of the decomposable attention neural network, to compare the first entity to a second entity, of the entities, represented by its own matrix of embeddings and to determine if the third matrix matches the matrix of embeddings representing the second entity based on the comparing.

16. The non-transitory machine-readable medium of claim 15, wherein the operations further comprise:
obtaining a second entity in a second table, the second entity comprising a plurality of fields, each field in the second entity including a field identification and a value;
tokenizing the values in each of one or more fields of the plurality of fields in the second entity into one or more tokens;
passing each of the one or more tokens to the embedding machine learned model, producing embeddings comprising a set of coordinates for each of the one or more tokens of the second entity;
concatenating the embeddings for each of the one or more tokens and for each of the one or more fields of the plurality of fields in the second entity into a fourth matrix;
constructing a field-of-origin sequence for the second entity, the field-of-origin sequence comprising a combination of the field identifications of the one or more fields in the second entity;
passing each field identification in the field-of-origin sequence for the second entity into the embedding machine learned model to generate a set of coordinates for identification value in the field-of-origin sequence for the second entity;

concatenating the embeddings for each field identification in the field-of-origin sequence for the second entity into a fifth matrix; and stacking the fourth and fifth matrix to create a sixth matrix, the sixth matrix being compared to the third matrix by the decomposable attention neural network.

17. The non-transitory machine-readable medium of claim 16, wherein the operations further comprise passing output of the decomposable attention neural network to a classifier module, the classifier module comprising a dense neural network with a multi-class output.

18. The non-transitory machine-readable medium of claim 17, wherein the multi-class output includes separate classes for match, partial match, and no match.

19. The non-transitory machine-readable medium of any of claim 15, wherein the operations further comprise splitting the plurality of fields in the first entity into three categories of fields: text-based fields, categorical fields, and numerical/date fields, and wherein the one or more fields of the plurality of fields are the text-based fields.

20. The system of claim 1, wherein the decomposable attention neural network is jointly trained with a classifier module.

\* \* \* \* \*